US012236225B2

(12) United States Patent
Taki et al.

(10) Patent No.: US 12,236,225 B2
(45) Date of Patent: Feb. 25, 2025

(54) IDENTIFYING A LIMITED FUNCTION OF A MOBILE OBJECT DURING UPDATE OF A MOBILE OBJECT CONTROL UNIT

(71) Applicant: HONDA MOTOR CO.,LTD., Tokyo (JP)

(72) Inventors: Tomoaki Taki, Tokyo (JP); Yosuke Shionoya, Tokyo (JP); Kohei Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 392 days.

(21) Appl. No.: 17/572,650

(22) Filed: Jan. 11, 2022

(65) Prior Publication Data
US 2022/0219566 A1 Jul. 14, 2022

(30) Foreign Application Priority Data
Jan. 14, 2021 (JP) .................................. 2021-004559

(51) Int. Cl.
*G06F 8/65* (2018.01)
*B60L 53/62* (2019.01)
(Continued)

(52) U.S. Cl.
CPC ................ *G06F 8/65* (2013.01); *B60L 53/62* (2019.02); *B60L 53/65* (2019.02); *B60L 58/12* (2019.02); *G06F 8/71* (2013.01)

(58) Field of Classification Search
None
See application file for complete search history.

(56) References Cited

U.S. PATENT DOCUMENTS

2008/0293397 A1* 11/2008 Gajdos ................. H04W 88/02
455/420
2009/0300595 A1* 12/2009 Moran ...................... G06F 8/65
717/173
(Continued)

FOREIGN PATENT DOCUMENTS

CN 103365397 A 10/2013
CN 106066800 A 11/2016
(Continued)

OTHER PUBLICATIONS

Office Action issued for counterpart Japanese Application No. 2021-004559, issued by the Japanese Patent Office on Nov. 22, 2022 (drafted on Nov. 14, 2022).
(Continued)

*Primary Examiner* — Qing Chen

(57) ABSTRACT

The control system comprises: a mobile object control unit configured to control a mobile object; an update control unit configured to control reception of an update program for the mobile object control unit from an external device and to control an update of the mobile object control unit with the update program; and a notification control unit configured to notify a user of information on a function to be limited in the mobile object that occurs during the update of the mobile object control unit, wherein, for the update program, identification information is given for identifying a function to be limited in the mobile object during the update of the mobile object control unit with the update program, and the notification control unit, based on the identification information given to the update program, controls notification to the user of the information on the function to be limited.

18 Claims, 12 Drawing Sheets

(51) Int. Cl.
*B60L 53/65* (2019.01)
*B60L 58/12* (2019.01)
*G06F 8/71* (2018.01)

(56) References Cited

U.S. PATENT DOCUMENTS

| | | | | |
|---|---|---|---|---|
| 2011/0320089 | A1* | 12/2011 | Lewis | G01C 21/3896 |
| | | | | 380/278 |
| 2013/0262716 | A1 | 10/2013 | Noro | |
| 2017/0262277 | A1* | 9/2017 | Endo | G06F 8/658 |
| 2018/0072162 | A1* | 3/2018 | Liu | G07C 5/008 |
| 2018/0290553 | A1* | 10/2018 | Malik | B60L 53/00 |
| 2018/0357071 | A1* | 12/2018 | Hu | G06F 9/445 |
| 2020/0057630 | A1* | 2/2020 | Cho | G06F 8/65 |
| 2020/0125161 | A1* | 4/2020 | Duale | G06F 1/3212 |
| 2020/0225930 | A1* | 7/2020 | Teraoka | G06F 8/65 |
| 2021/0191661 | A1 | 6/2021 | Harata | |

FOREIGN PATENT DOCUMENTS

| | | | |
|---|---|---|---|
| CN | 107193578 | A | 9/2017 |
| JP | 2018132979 | A | 8/2018 |
| JP | 2020027666 | A | 2/2020 |
| JP | 2020176974 | A | 10/2020 |

OTHER PUBLICATIONS

Office Action issued for counterpart Chinese Application 202111499049.2, issued by the State Intellectual Property Office of People's Republic of China on Jan. 13, 2025.

\* cited by examiner

IDENTIFICATION INFORMATION ON UPDATE PROGRAM FOR ECU 205

| FUNCTION ID | VEHICLE TYPE INFORMATION | | | | ECU INFORMATION | | |
|---|---|---|---|---|---|---|---|
| | TYPE 1 | TYPE 2 | TYPE 3 | ··· | ECU1 | ECU2 | ··· |
| CHARGE | 0 | 1 | 1 | ··· | 0 | 0 | ··· |

IDENTIFICATION INFORMATION ON UPDATE PROGRAM FOR ECU 206

| FUNCTION ID | VEHICLE TYPE INFORMATION | | | | ECU INFORMATION | | |
|---|---|---|---|---|---|---|---|
| | TYPE 1 | TYPE 2 | TYPE 3 | ··· | ECU1 | ECU2 | ··· |
| LOCK | 1 | 1 | 1 | ··· | 0 | 0 | ··· |

FIG.5

IDENTIFYING A LIMITED FUNCTION OF A MOBILE OBJECT DURING UPDATE OF A MOBILE OBJECT CONTROL UNIT

The contents of the following Japanese patent application (s) are incorporated herein by reference: NO. 2021-004559 filed on Jan. 14, 2021.

BACKGROUND

1. Technical Field

The present invention relates to a control system, a mobile object, an information processing apparatus, a control method, an information processing method, and a computer-readable storage medium.

2. Related Art

Patent Document 1 discloses, as an ECU for vehicles, an ECU which can rewrite an application program.

PRIOR ART DOCUMENT

Patent Document

[Patent Document 1]: Japanese Patent Application Publication No. 2020-27666

BRIEF DESCRIPTION OF THE DRAWINGS

FIG. 5 illustrates a data structure, in a table format, of identification information given to an update program.

DESCRIPTION OF EXEMPLARY EMBODIMENTS

While the present invention will be described below by means of embodiments of the invention, these embodiments below are not intended to limit the invention defined by the claims. In addition, all combinations of features set forth in the embodiments are not necessarily essential to the solutions of the present invention.

Figure 1:
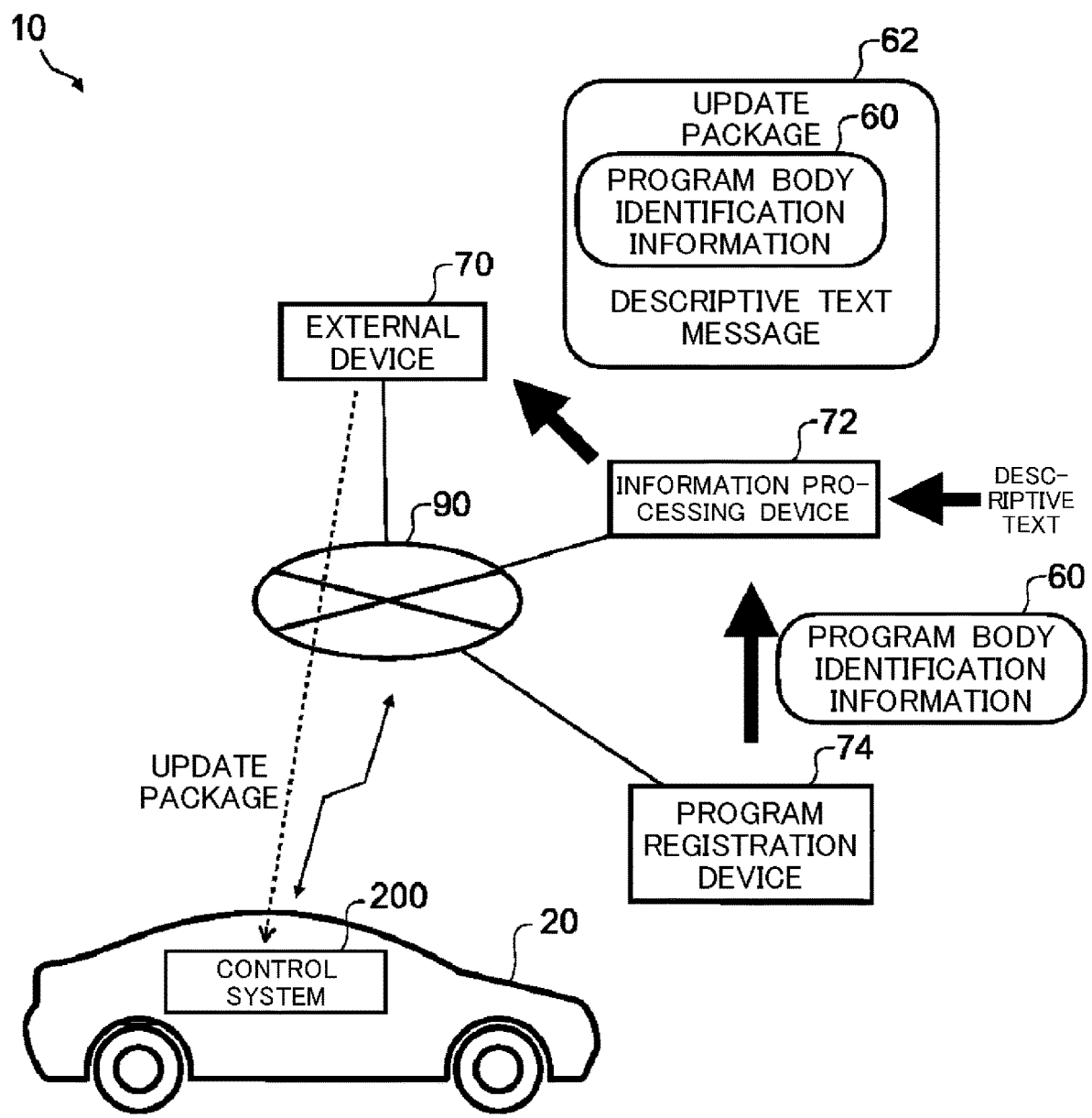
FIG. 1 schematically illustrates an update system 10 according to an embodiment.

FIG. 1 schematically illustrates an update system 10 according to an embodiment. The update system 10 comprises a vehicle 20, an external device 70, an information processing apparatus 72, and a program registration device 74. The vehicle 20 comprises a control system 200. The control system 200 is responsible for control of the vehicle 20 and communication with the external device 70 via a communication network 90. The communication network 90 includes an IP network such as the Internet, a P2P network, a dedicated line including a VPN, a virtual network, a mobile communication network, and the like.

In the vehicle 20, the control system 200 comprises a plurality of ECUs (Electronic Control Units) for controlling the vehicle 20. The control system 200 acquires an update program from the outside for the ECU provided in the control system 200. For example, the control system 200 receives the update program 60 transmitted by wireless communication from the external device 70 over the communication network 90. The control system 200 reprograms the ECU provided in the control system 200 by means of the update program 60. Reprogramming is performed aiming for upgrading or the like of functions of the ECU provided in the control system 200. In this manner, the control system 200 updates the ECU by reprogramming the ECU through an OTA (Over The Air). In this embodiment, updating a device such as the ECU with the update program is referred to as a "program update".

In FIG. 1, the update program 60 is created by a software creator, for example, and registered in a program registration device 74. The update program 60 contains a program body and identification information. The program body is program codes executed by the ECU. The identification information is information for identifying a function to be limited in the vehicle 20 when the program update is performed with the update program 60. For example, when the update program 60 is a program for the ECU that controls a battery in the vehicle 20, a charging function of the battery may be limited during the program update with the update program 60. In this case, the identification information of the update program 60 may be flag information indicating the "charging function". A creator of the update program 60 embeds the identification information in the update program 60 when generating the update program 60. The program registration device 74 uploads the update program 60 to the information processing apparatus 72 over the communication network 90.

The information processing apparatus 72 gives a descriptive text relating to the update program 60 to the update program 60. The descriptive text is, for example, a text describing a function to be added by the program update with the update program 60. The descriptive text is input by a creator of the descriptive text into the information processing apparatus 72. The information processing apparatus 72 gives the descriptive text to the update program 60 and, based on the identification information embedded in the update program 60, automatically generates a message to be notified to a user before the program update is performed with the update program 60 to give the message to the update program 60. The information processing apparatus 72 uploads an update package 62 containing the update program 60, the descriptive text, and the message to the external device 70. The external device 70 transmits the update package 62 to the vehicle 20.

The control system 200, before the program update is performed with the update program 60 contained in the update package 62, displays the descriptive text and the message contained in the update package 62 for notification to the user. In addition, the control system 200, based on the identification information contained in the update program 60, notifies the user of the function to be limited during the program update. This allows explicitly informing the user of the function to be limited before a function limitation occurs due to the program update. In addition, in the information processing apparatus 72, the message is automatically generated by means of the identification information embedded in the update program 60 and given to the update package 62, which can reduce the possibility, due to human errors or the like, for the update package 62 to be transmitted to the vehicle 20 before the descriptive text related to the function limitation is given.

Figure 2:
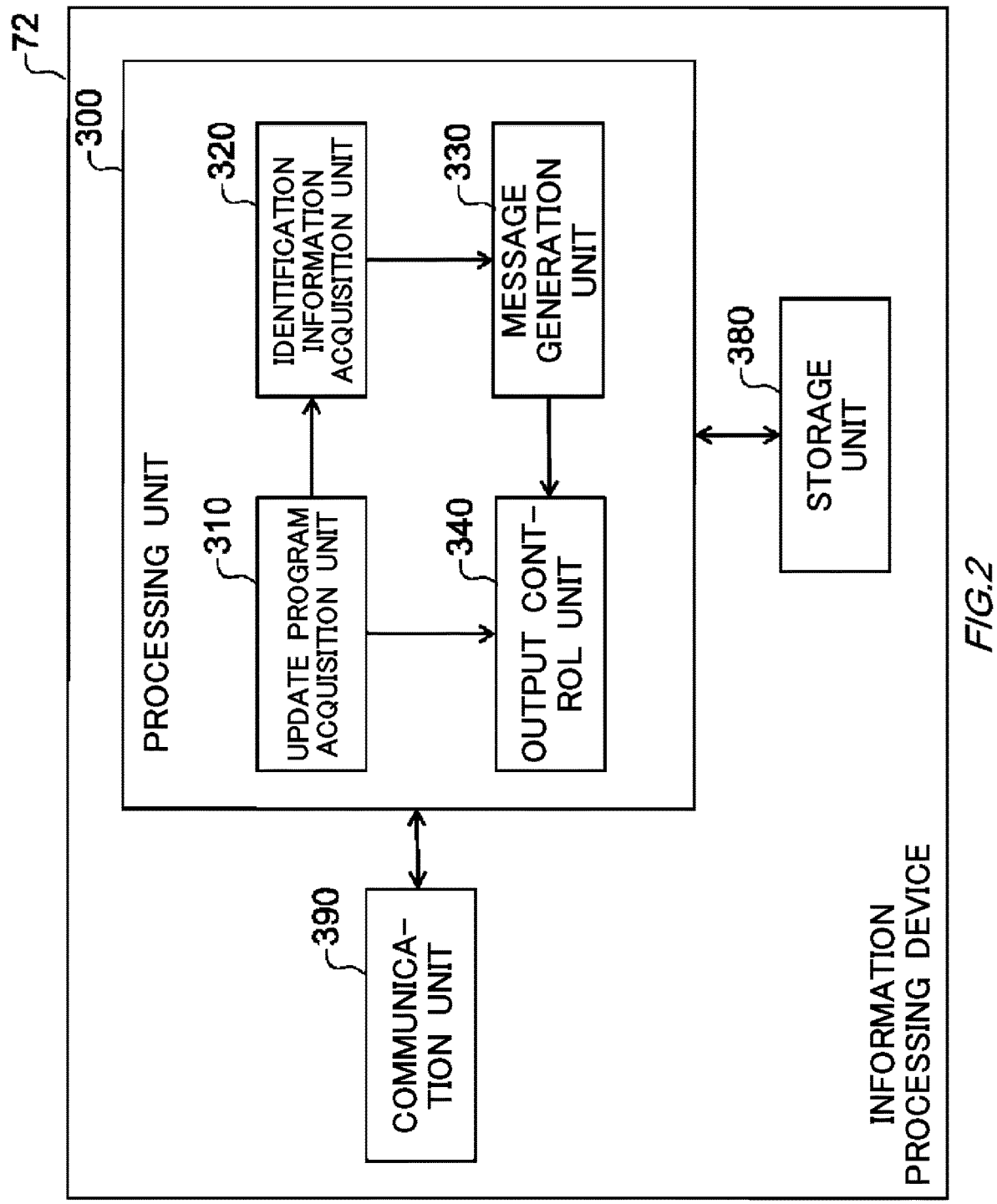
FIG. 2 schematically illustrates a system configuration provided in an information processing apparatus 72.

FIG. 2 schematically illustrates a system configuration provided in the information processing apparatus 72. The information processing apparatus 72 comprises a processing unit 300, a storage unit 380, and a communication unit 390. The processing unit 300 comprises an update program acquisition unit 310, an identification information acquisition unit 320, a message generation unit 330, and an output control unit 340.

The processing unit 300 is embodied by a computational processing device including a processor, for example. The storage unit 380 is embodied by comprising a non-volatile storage medium. The processing unit 300 performs processing using information stored in the storage unit 380. The communication unit 390 is responsible for communication between the external device 70 and the program registration device 74.

The information processing apparatus 72 generates function limitation information indicative of the function to be limited in the vehicle 20 during the update of the ECU provided in the vehicle 20 with the update program. For the update program, the identification information is given for identifying the function to be limited in the vehicle 20 during the update of the ECU with the update program. The update program acquisition unit 310 acquires the update program. For example, the update program acquisition unit 310 acquires the update program created by the software creator.

The identification information acquisition unit 320 acquires the identification information given to the update program. The message generation unit 330, based on the identification information acquired by the identification information acquisition unit 320, generates a message to be output when the ECU is updated with the update program. For example, the message generation unit 330 generates a predetermined fixed message that is corresponded to the identification information. The output control unit 340 controls an output of the message generated by the message generation unit 330. For example, the output control unit 340 outputs the message while corresponding it to the update program acquired by the update program acquisition unit 310.

Figure 3:
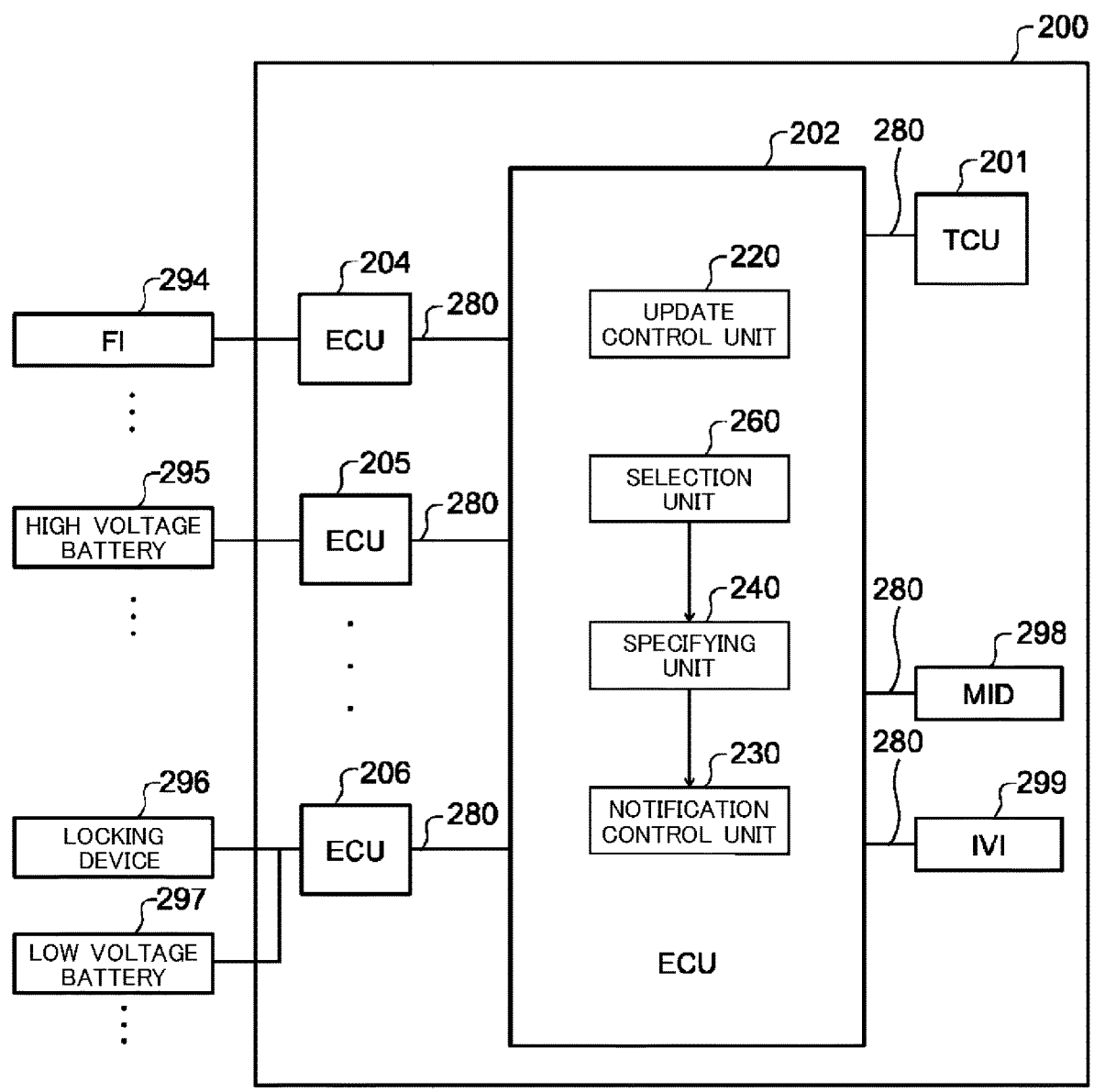
FIG. 3 schematically illustrates a system configuration provided in a control system 200.

FIG. 3 schematically illustrates a system configuration provided in the control system 200. The control system 200 comprises a TCU 201, an ECU 202, an ECU 204, an ECU 205, an ECU 206, an MID 298, and an IVI 299. In FIG. 3, an FI 294, a high voltage battery 295, a locking device 296, and a low voltage battery 297 are examples of controlled devices provided in the vehicle 20.

The ECU 202 is connected with the TCU 201, the ECU 204, the ECU 205, and the ECU 206 over in-vehicle communication lines 280. The ECU 202 communicates mutually with the TCU 201, the ECU 204, the ECU 205, the ECU 206, the MID 298, and the IVI 299 over the in-vehicle communication lines 280. The ECU 202 integrally controls the TCU 201, the ECU 204, the ECU 205, the ECU 206, the MID 298, and the IVI 299. The in-vehicle communication lines 280 may be configured including a CAN (Controller Area Network) or an EtherNetwork, for example.

The TCU 201 is a Telematics Control Unit. The TCU 201 is mainly responsible for mobile communications. The TCU 201 transmits and receives data to and from the external device 70 based on the control by the ECU 202. The TCU 201 receives the update program transmitted from the external device 70 through the mobile communications based on the control by the ECU 202. The TCU 201 can function as a wireless communication unit.

The MID 298 is a multi-information display. The IVI 299 is an in-vehicle infotainment (IVI) information device, for example. The MID 298 and the IVI 299 may function as display control units. The IVI 299 comprises a wireless LAN communication function. The IVI 299 receives the update program transmitted from the external device 70 through the wireless LAN communication based on the control by the ECU 202.

The ECU 204, the ECU 205, and the ECU 206 are each the ECU as the vehicle control unit for controlling the vehicle 20. The ECU 204, the ECU 205, and the ECU 206 are examples of "mobile object control units". The ECU 204, the ECU 205, and the ECU 206 control various types of devices provided in the vehicle 20. For example, the ECU 204 controls the FI 294 or the like as a fuel injection device. The ECU 205 controls, e.g. the high voltage battery 295. The high voltage battery 295 is, for example, a battery that accumulates power supplied to a motor for running provided in the vehicle 20. The ECU 206 controls, e.g. the locking device 296 and low voltage battery 297. The locking device 296 is a device for locking a door or the like of the vehicle 20. The low voltage battery 297 functions as a 12-V power supply for the vehicle, for example. The low voltage battery 297 is, for example, a lead storage battery or the like.

While this embodiment illustrates the system configuration in which the control system 200 comprises the TCU 201, the ECU 202, the ECU 204, the ECU 205, the ECU 206, the MID 298, and the IVI 299, the system configuration of the control system 200 is not limited to the example in this embodiment. In addition, this embodiment describes an illustration in which the ECU 205 and the ECU 206 are the mobile object control units that can be targeted for the program update and the ECU 202 functions as the update control unit for controlling the program update. Note that the mobile object control unit that can be targeted for the program update is not limited to these ECUs. The mobile object control unit that can be targeted for the program update may be any of the TCU 201, the ECU 202, the ECU 204, the ECU 205, the ECU 206, the MID 298, and the IVI 299.

The ECU 202 comprises an update control unit 220, a notification control unit 230, a specifying unit 240, and a selection unit 260.

The update control unit 220 controls reception of the update program for the ECU from the external device, and controls the update of the ECU with the update program. The notification control unit 230 notifies the user of the information on the function to be limited in the vehicle 20 that occurs during the update of the ECU. The user is, for example, an occupant of the vehicle 20. For the update program, the identification information is given for identifying the function to be limited in the vehicle 20 during the update of the ECU with the update program. The notification control unit 230, based on the identification information given to the update program, controls notification to the user of the information on the function to be limited. For example, the notification control unit 230 may cause the MID 298 and the IVI 299 to perform notification to the user.

For the update program, the identification information is given as well as vehicle specifying information for specifying the vehicle 20 in which the function limitation occurs. The specifying unit 240, based on the identification information and the vehicle specifying information given to the update program, specifies the function to be limited in the vehicle 20 during the update of the ECU with the update program. The notification control unit 230, based on the function specified by the specifying unit 240, controls notification to the user of the information on the function to be limited.

The update control unit 220 controls reception of a plurality of update programs from the external device. The selection unit 260 selects the update program for updating the ECU from among the plurality of the update programs. The specifying unit 240, based on the identification information and the vehicle specifying information given to each of the plurality of the update programs, specifies the function to be limited in the vehicle 20 during the update of the ECU with the update program selected by the selection unit 260. The notification control unit 230, before the update of the ECU starts with the update program selected by the selection unit 260, notifies the user of the function specified by the specifying unit 240.

The selection unit 260, based on a remaining amount of the low voltage battery 297 provided in the vehicle 20, may select one update program for updating the ECU from among the plurality of the update programs. The selection unit 260, based on an amount of power to be consumed when the ECU to be targeted for the update is updated with each of the plurality of update program and the remaining amount of the low voltage battery 297, selects one update program for updating the ECU. Information on the amount of power to be consumed when the ECU is updated may be contained in the update package transmitted from the external device 70.

Here, the program update will be described. Program update processing will be described in the case where a device to be targeted for the program update is the ECU and a memory in the ECU for storing firmware is a single bank memory (so-called one-sided ROM). In this case, since there is only one program storage area in the ECU for storing the firmware, the update program cannot be written in the program storage area while the ECU is operating in accordance with the program stored in the program storage area. When the program update for the ECU is performed, the update control unit 220 transfers the update program to the ECU to store the update program in a predetermined data storage area in the ECU, and then instructs the ECU to perform the program update. The ECU, when the program update is instructed, executes a control code for performing the program update to write the update program transferred to the data storage area in the program storage area and activate the update program. Activation of the update program includes processing of setting a startup parameter of the ECU so as to load the update program upon starting up the ECU, for example, to start controlling based on the update program.

Next, program update processing will be described in the case where an internal memory in the ECU is a double bank memory (so-called two-sided ROM). In this case, since there are two program storage areas in the ECU for storing the firmware, the update program can be written in a second program storage area while the ECU is operating in accordance with the program stored in a first program storage area. That is, so-called back face writing enables the update program to be written in the second, or back face, program storage area. Accordingly, even while the vehicle 20 is running, for example, the update program can be written in the second program storage area. As such, the update control unit 220 transfers the update program to the ECU and then instructs the ECU to write the update program in the second program storage area. Upon completion of writing of the update program in the second program storage area in the ECU, the program update of the ECU is enabled. When the update control unit 220 performs the program update of the ECU, the update control unit 220 instructs the ECU to activate the update program written in the second program storage area. Activation of the update program includes processing of setting a startup parameter of the ECU so as to load the update program stored in the second program storage area upon starting up the ECU, for example, to start controlling based on the update program. For example, activation of the update program includes processing of validating the second program storage area as a readout area of the program while invalidating the first program storage area as the readout area of the program. In this manner, the "program update" is a concept that includes instruction to write the update program in the program storage area in the ECU. In addition, the "program update" is a concept that includes instruction to activate the update program written in the program storage area.

For the program update in the ECU with the single bank memory, there occurs the possibility that the ECU cannot control the vehicle during time frames in which the update program is written in the program storage area and in which the update program is activated. Accordingly, a time frame in which the function limitation occurs for the vehicle corresponds to the time frames in which the update program is written in the program storage area and in which the update program is activated. On the other hand, for the program update in the ECU with the double bank memory, the ECU can control the vehicle during the time frame in which the update program is written in the back face program storage area. Accordingly, for the program update in the ECU with the double bank memory, the time frame in which the function limitation occurs for the vehicle corresponds to the time frame in which the update program is activated. In this embodiment, the case will be described where the ECU 205 and the ECU 206 to be targeted for the update is the ECU comprising the double bank memory.

Figure 4:
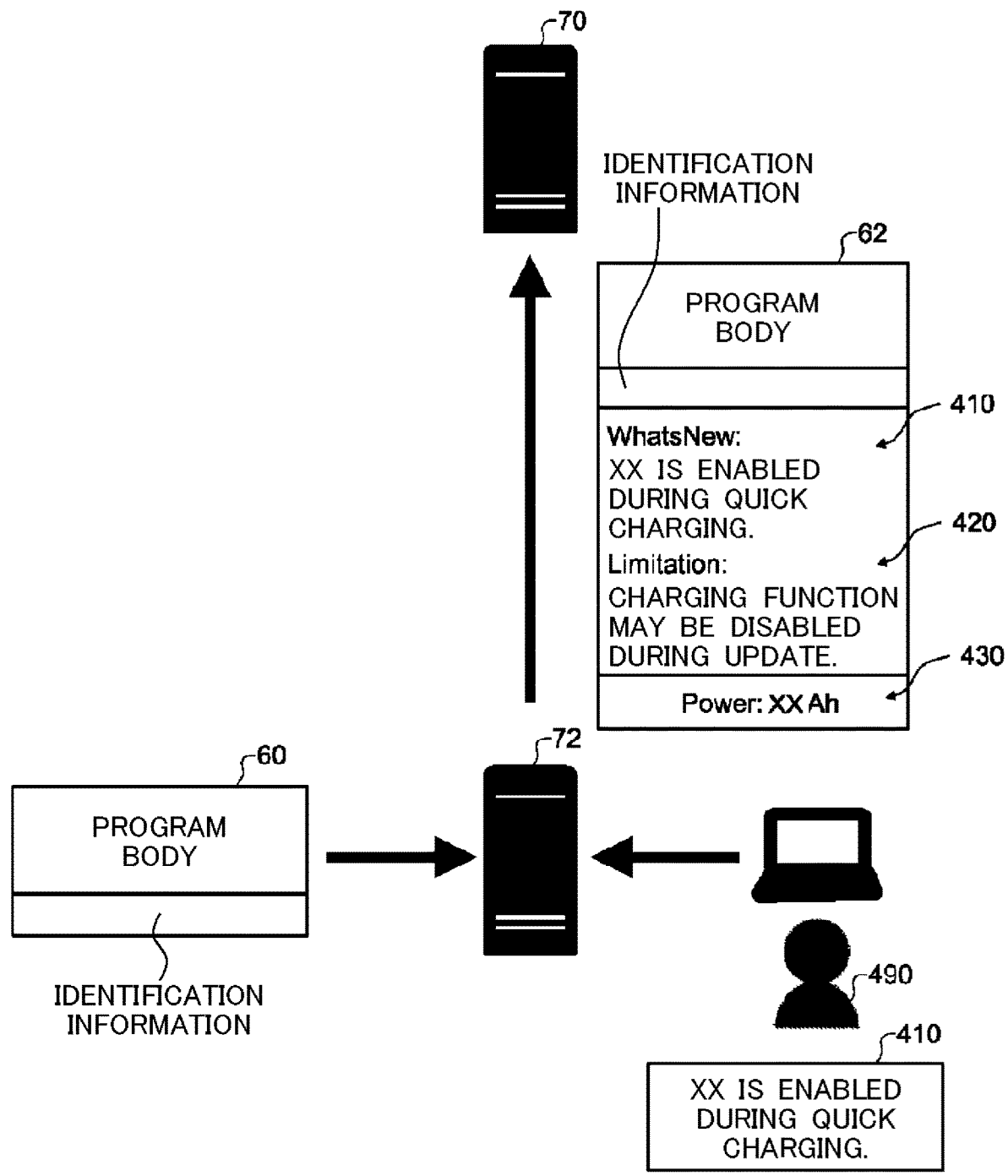
FIG. 4 schematically illustrates a flow of generating an update package 62 transmitted to a vehicle 20.

FIG. 4 schematically illustrates a flow of generating an update package 62 transmitted to the vehicle 20. The update program 60 is created by the software creator and uploaded to the information processing apparatus 72 through the program registration device 74. In a step of creating the update program 60 by the software creator, the update program 60 is embedded with the identification information for indicating the function to be limited in the vehicle during the program update.

In the information processing apparatus 72, the update program acquisition unit 310 stores the update program 60 received from the program registration device 74 in the storage unit 380. A program administrator 490 inputs the descriptive text for the update program 60 into the information processing apparatus 72. For example, when the update program 60 is an update program for the ECU 205, the descriptive text is input describing the function to be added by the update program 60. The descriptive text is to input the sentence, e.g. "XX is enabled during quick charging." In the information processing apparatus 72, the storage unit 380 stores the descriptive text while corresponding it to the update program 60.

In the information processing apparatus 72, the identification information acquisition unit 320 reads out the identification information from the update program 60. The message generation unit 330 generates a fixed message based on the identification information read out from the update program 60. For example, the storage unit 380 stores the fixed message while corresponding it to the identification information. For example, the storage unit 380 stores the message "Charging function may be disabled while updating." while corresponding it to the identification information that indicates the "charging function." The message generation unit 330 generates the message stored in the storage unit 380 while corresponding it to the identification information read out from the update program 60.

The output control unit 340 attaches the message generated by the message generation unit 330 to the update program 60. In addition, the output control unit 340 attaches power consumption information that indicates an amount of power to be consumed when the update of the ECU is performed to the update program 60. For example, the storage unit 380 stores the power consumption information indicating the amount of power to be consumed when the update of the ECU is performed while corresponding it to the identification information of the update program 60. The output control unit 340 attaches the power consumption information, which is stored in the storage unit 380 while corresponding it to the identification information of the update program 60, to the update program 60. In the example in FIG. 4, the power consumption information is attached to the update program 60 indicating that the amount of power consumed when the update of the ECU is performed is "XXAh."

The output control unit 340 generates the update package 62 containing the update program that contains the program body and the identification information, a descriptive text 410, a message 420, and amount of power information 430. The output control unit 340 transmits the generated update package 62 to the external device 70 through the communication unit 390.

FIG. 5 illustrates a data structure, in a table format, of the identification information given to the update program. FIG. 5 illustrates the data structures of the identification information of the update program for the ECU 205 and the identification information of the update program for the ECU 206. The identification information includes a function ID, vehicle type information, and ECU information. The function ID is information for identifying the function to be limited in the vehicle during the program update.

The vehicle type information is information indicating a vehicle type for which the function is limited during the program update. "0" represents that the function is not limited during the program update, and "1" represents that the function is limited during the program update. When the program update is performed, the function limitation may occur for a specific vehicle type. For example, the limitation on the charging function occurs only for an electric vehicle comprising the high voltage battery 295, while the limitation on the charging function does not occur when the program update is performed for a gasoline vehicle not comprising the high voltage battery 295. The vehicle type information sets for which type of vehicles the function limitation occurs. The example in FIG. 5 indicates that, for vehicles of "vehicle type 1," the function is not limited during the program update, and for vehicles of "vehicle type 2" and "vehicle type 3," the functions are limited during the program update. The vehicle 20, by referring to the vehicle type information, can determine whether the function is limited during the program update of the ECU.

The ECU information is information indicating a combination with the ECU for which the function limitation occurs during the program update. "0" represents that the function is not limited during the program update, and "1" represents that the function is limited during the program update. When the program update is performed for a plurality of ECUs, the function limitation may occur only when the program update is performed for a combination with the specific ECU. The ECU information sets for which ECU combination the function limitation occurs during the program update. The vehicle 20, by referring to the ECU information, can determine whether the function is limited during the program update.

Figure 6:
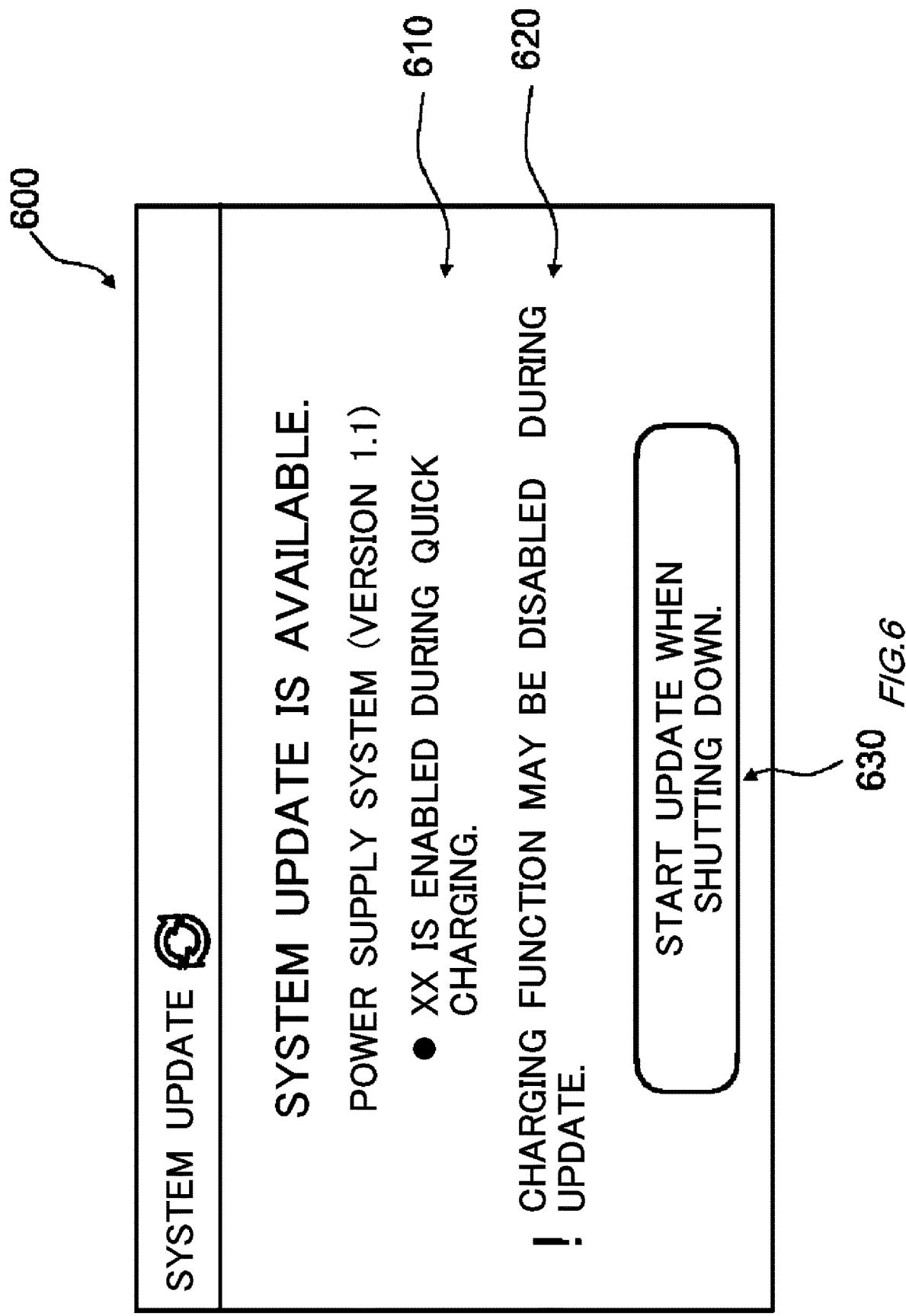
FIG. 6 illustrates an example of user notification information 600 displayed on an IVI 299.

FIG. 6 illustrates an example of user notification information 600 displayed on the IVI 299. The notification control unit 230, when the update package 62 is downloaded from the external device 70 and before the update program is written in the program storage area in the ECU, displays the user notification information 600 on the IVI 299. Information 610 of the user notification information 600 is a descriptive text contained in the update package 62. Information 620 of the user notification information 600 is a message contained in the update package 62. The user notification information 600 can notify the user which function is added by the program update. In addition, it can notify the user in advance which function is to be limited in activation of the update program 60.

The user can touch an UI button 630 in the user notification information 600 to instruct that the program update is started after an IG switch of the vehicle is turned off. When the user touches the UI button 630, the update control unit 220 starts writing the update program 60 in the back face program storage area in the ECU 205. The update control unit 220, after completion of writing the update program 60 in the back face program storage area and after the IG switch of the vehicle 20 is turned off, performs activation of the update program 60.

Figure 7:
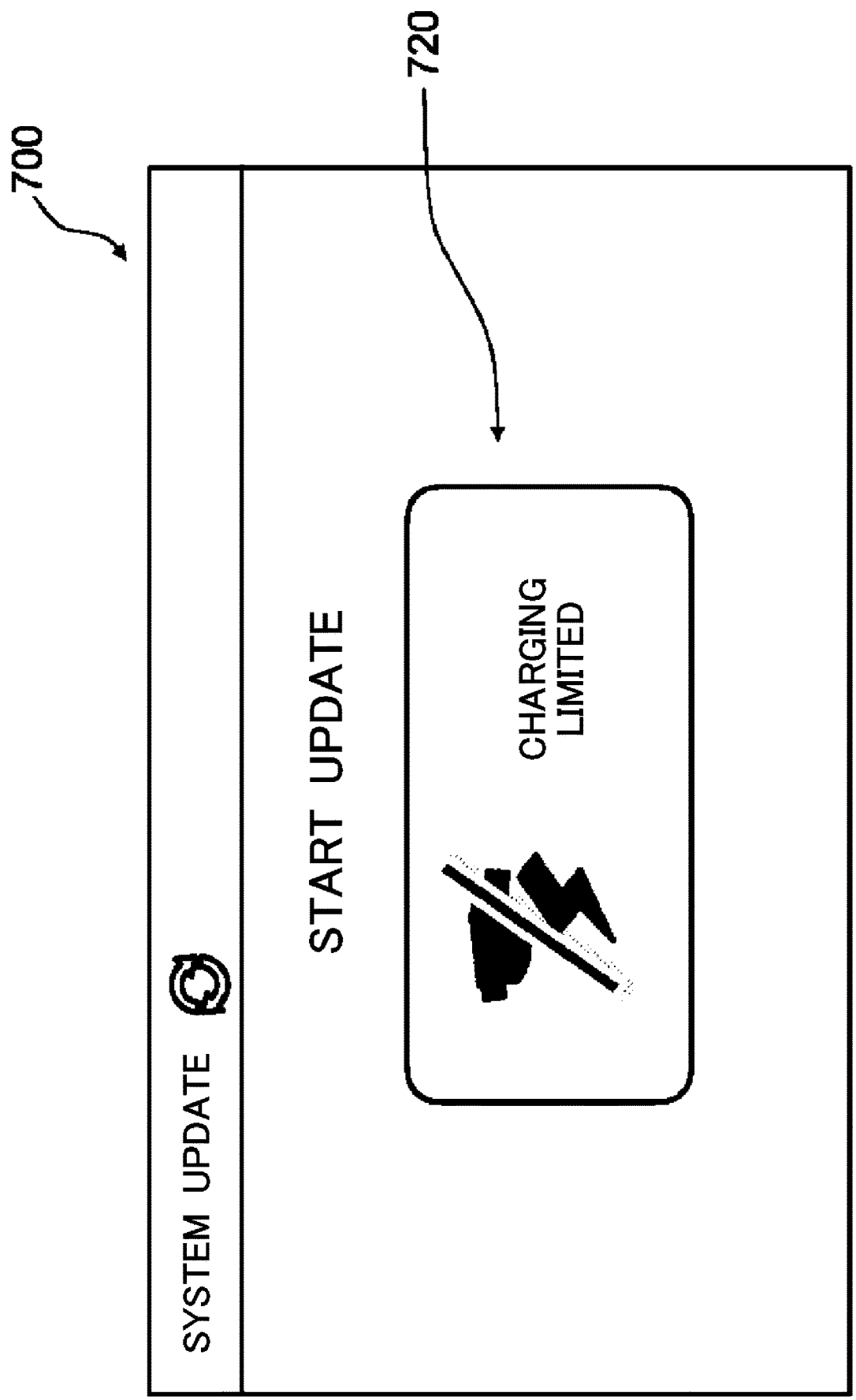
FIG. 7 illustrates an example of user notification information 700 displayed on the IVI 299 before activation is performed.

FIG. 7 illustrates an example of user notification information 700 displayed on the IVI 299 before activation is performed. The notification control unit 230, when the IG switch of the vehicle 20 is turned off, displays the user notification information 700 on the IVI 299 before the activation is performed if writing of the update program 60 in the back face program storage area is completed. At this time, the notification control unit 230 displays function limitation information 720 corresponding to the identification information contained in the update package 62 on the IVI 299. The function limitation information 720 includes an icon indicating that the charging function is limited. Displaying the icon allows the user to know the function to be limited at a glance. The notification control unit 230 controls the IVI 299 so that the function limitation information 720 is displayed on the foreground of the display surface.

In this manner, the notification control unit 230 causes the function limitation information 720 to be displayed before the activation is performed. It enables the user to recognize that the charging function is limited even when displaying the user notification information 600 in FIG. 6 fails to cause the user to fully recognize that the charging function is limited.

Figure 8:
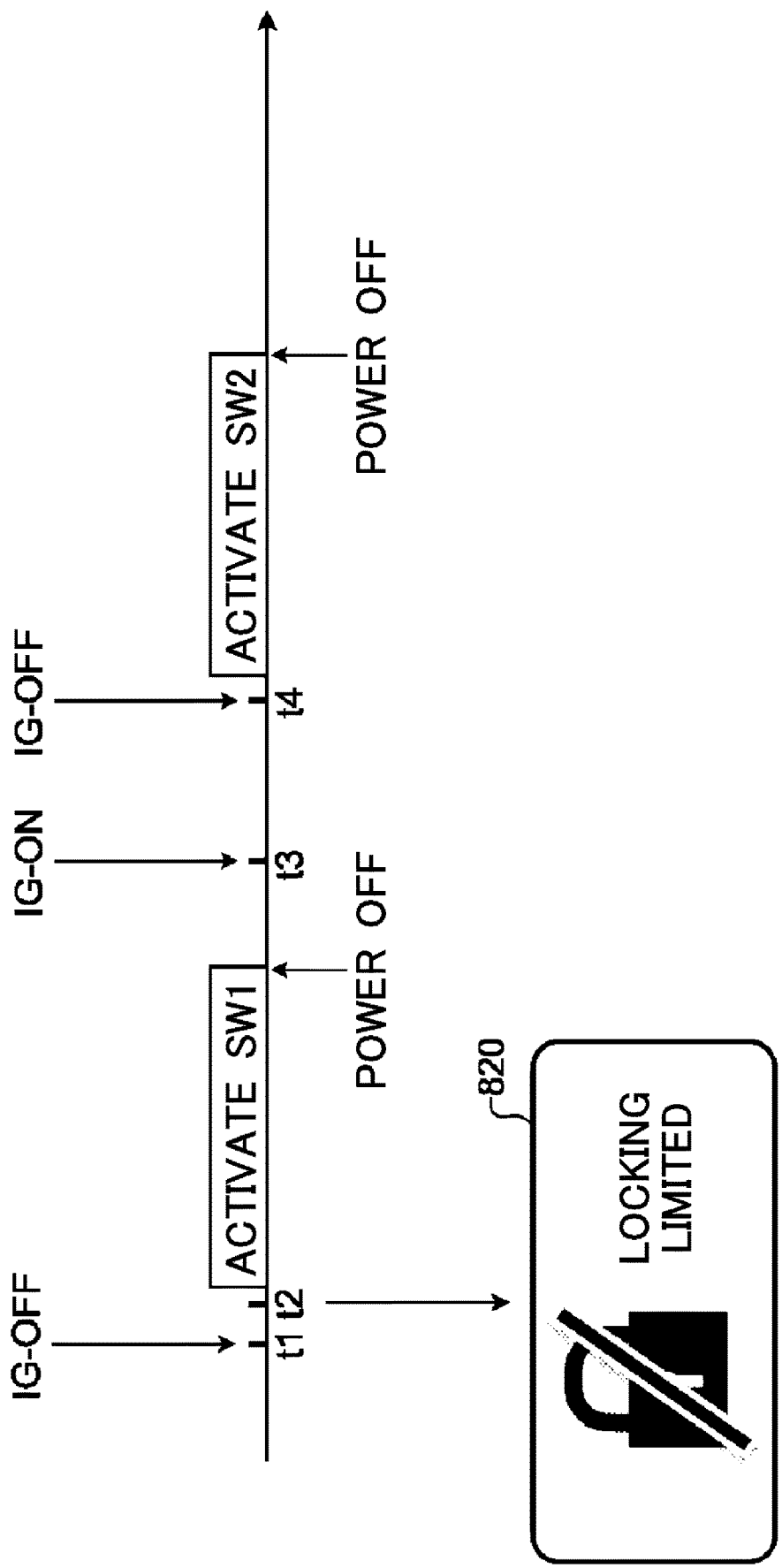
FIG. 8 illustrates a program update in the case where a vehicle 20 is a vehicle A corresponding to a "vehicle type 1" in FIG. 5.
Figure 9:
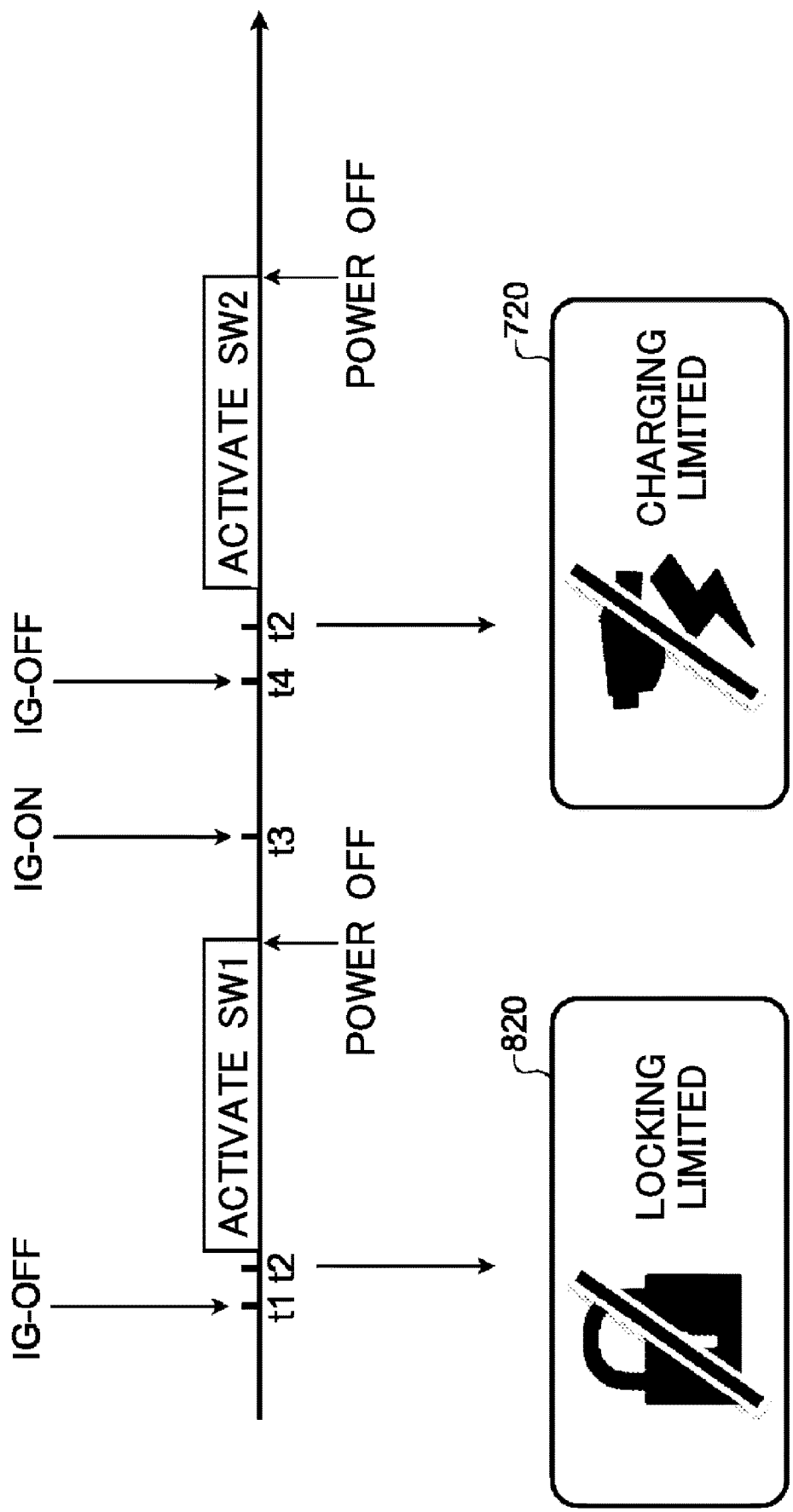
FIG. 9 illustrates a program update in the case where the vehicle 20 is a vehicle B corresponding to a "vehicle type 2" in FIG. 5.
Figure 10:
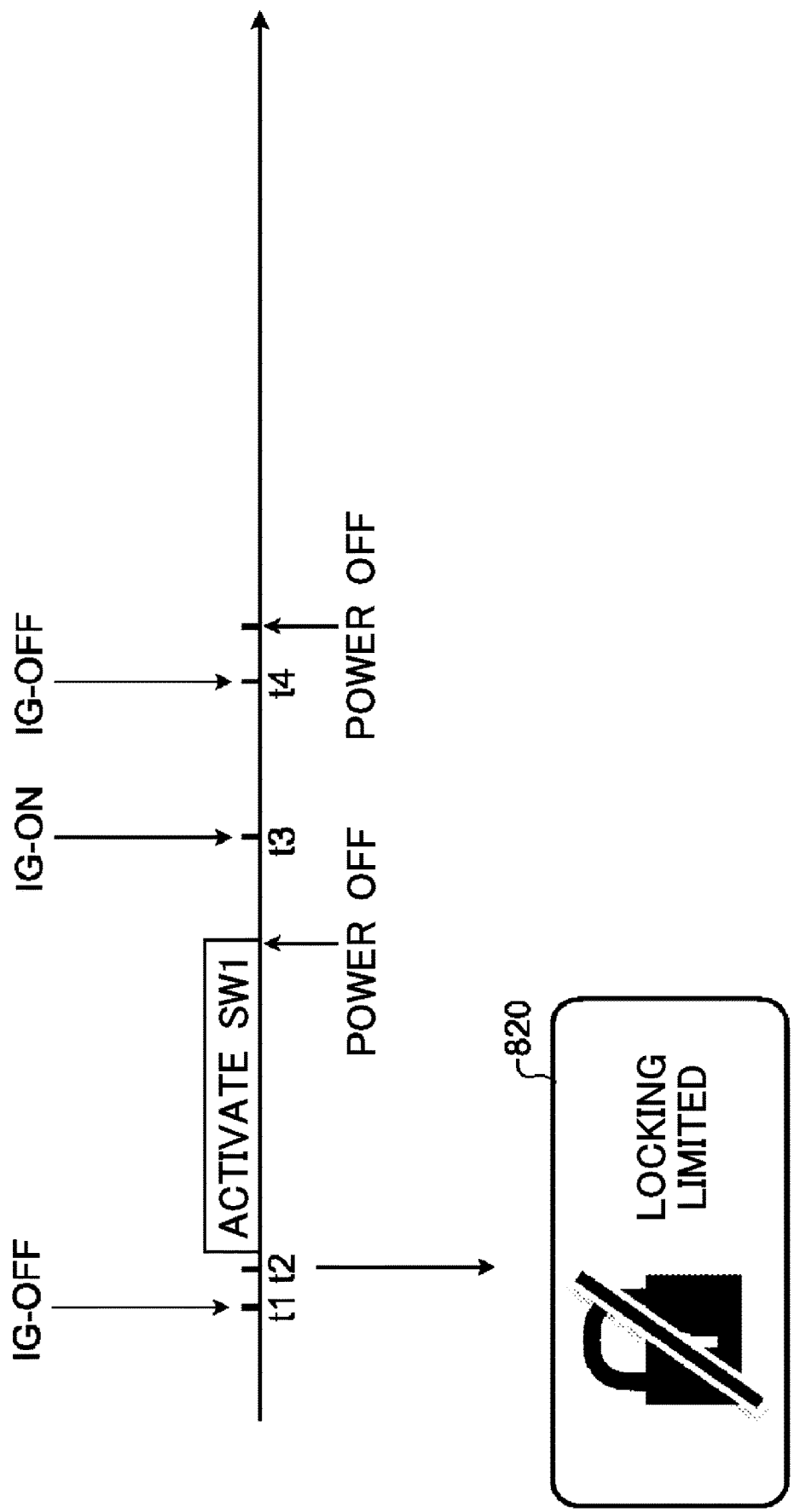
FIG. 10 illustrates a flow of processing to be performed in activation of the update program.

FIG. 8, FIG. 9, and FIG. 10 illustrate flows of processing to be performed in activation of the update program. FIG. 8 illustrates a program update in the case where the vehicle 20 is a vehicle A corresponding to the "vehicle type 1" in FIG. 5. FIG. 9 illustrates a program update in the case where the vehicle 20 is a vehicle B corresponding to the "vehicle type 2" in FIG. 5. FIG. 10 illustrates a program update in the case where the vehicle 20 is a vehicle corresponding to the "vehicle type 3" in FIG. 5. Assume that, in the cases of FIG. 8 and FIG. 9, the writing is completed of the update program in the back face program storage areas of the ECU 205 and the ECU 206. FIG. 10 is the case in which the program update is performed only for the ECU 206, and it is assumed that the writing is completed of the update program in the back face program storage area of the ECU 206.

In FIG. 8, the IG switch is turned off at time t1, and then the selection unit 260 selects the update program for performing the program update from among the update program for the ECU 205 and the update program for the ECU 206. The selection unit 260 acquires a remaining capacity of the low voltage battery 297 and calculates the amount of power available for the program update from the remaining capacity of the low voltage battery 297. The selection unit 260, from the amount of power indicated by the power consumption information attached to the respective update packages for the ECU 205 and the ECU 206, specifies the power consumption during the program update for the ECU 205 and the power consumption during the program update for the ECU 206. The selection unit 260 selects the update program so that a total value of the specified power consumption does not exceed the amount of power available for the program update.

FIG. 8 illustrates the case in which the update program for the ECU 206 is selected on an IG-off at the time t1. As shown in FIG. 5, for the vehicle A corresponding to the "vehicle type 1," the locking function is limited when the program update is performed for the ECU 206. As such, the specifying unit 240, based on the vehicle type information of the vehicle 20 itself, specifies the "locking function" as the function to be limited when the program update is performed for the ECU 206. The notification control unit 230, at time t2, displays function limitation information 820 indicating that the locking function is limited on the IVI 299. Thereafter, the update control unit 220 performs processing for activating the update program for the ECU 206 and turns off a power status of the vehicle 20.

After the IG switch is turned on at time t3 and the vehicle 20 runs, the IG switch is turned off at time t4. When the IG switch is turned off, the selection unit 260, based on the remaining capacity of the low voltage battery 297 and the power consumption during the program update for the ECU 205, determines that the program update can be performed for the ECU 205, and then selects the ECU 205 as the ECU for which the program update is performed. As shown in FIG. 5, for the vehicle A corresponding to the "vehicle type 1," the charging function is not limited when the program update for the ECU 205 is performed. As such, the update control unit 220 performs processing for activating the update program for the ECU 205 without the notification control unit 230 displaying the function limitation information on the IVI 299, and turns off the power status of the vehicle 20.

Next, with reference to FIG. 9, the case will be described in which the vehicle 20 is the vehicle B corresponding to the "vehicle type 2" in FIG. 5. Here, it is assumed that the update program for the ECU 206 is selected on the IG-off at the time t1, as with the case in FIG. 8, and the update program for the ECU 205 is selected on the next IG-off.

As shown in FIG. 5, for the vehicle B corresponding to the "vehicle type 2," the locking function is limited when the program update is performed for the ECU 206. As such, the specifying unit 240 specifies the "locking function" as the function to be limited when the program update is performed for the ECU 206. The notification control unit 230, at the time t2, displays the function limitation information 820 indicating that the locking function is limited on the IVI 299. Thereafter, the update control unit 220 performs processing for activating the update program for the ECU 206 and turns off the power status of the vehicle 20.

After the IG switch is turned on at the time t3 and the vehicle 20 runs, the IG switch is turned off at the time t4. The selection unit 260 selects the ECU 205 as the ECU for which the program update is performed. As shown in FIG. 5, for the vehicle B corresponding to the "vehicle type 2," the charging function is limited when the program update is performed for the ECU 205. As such, the notification control unit 230 displays the function limitation information 720 indicating that the charging function is limited on the IVI 299. Thereafter, the update control unit 220 performs processing for activating the update program for the ECU 205 and turns off the power status of the vehicle 20.

Next, with reference to FIG. 10, the case will be described in which the vehicle 20 is the vehicle C corresponding to the "vehicle type 3" in FIG. 5. Assume that, as with the case in FIG. 8, the selection unit 260 selects the update program for the ECU 206 on the IG-off at the time t1 based on the remaining capacity of the low voltage battery 297 and the power consumption information.

As shown in FIG. 5, for the vehicle C corresponding to the "vehicle type 3," the locking function is limited when the program update is performed for the ECU 206. As such, the specifying unit 240 specifies the "locking function" as the function to be limited when the program update is performed for the ECU 206. The notification control unit 230, at the time t2, displays the function limitation information 820 indicating that the locking function is limited on the IVI 299. Thereafter, the update control unit 220 performs processing for activating the update program for the ECU 206 and turns off a power status of the vehicle 20. Then, after the IG switch is turned on at the time t3 and the vehicle 20 runs, the IG switch is turned off at the time t4. The power status of the vehicle 20 is turned off at time t5 because there is no ECU to be targeted for the program update.

As described with reference to FIG. 8 to FIG. 10, the update system 10 enables proper notification to the user of the function to be limited when the program update is performed for each vehicle.

Figure 11:
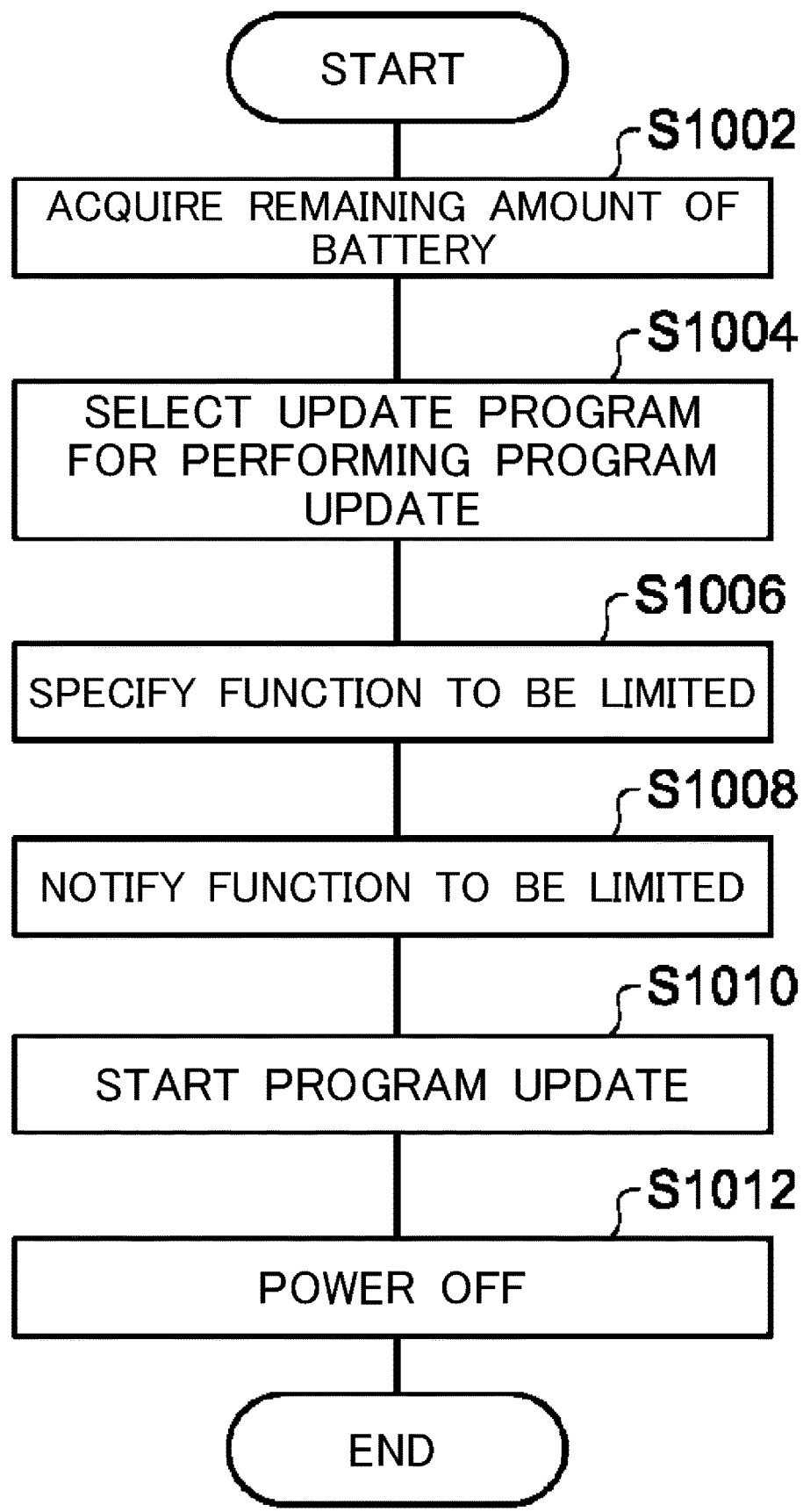
FIG. 11 illustrates a flowchart of an exemplary execution procedure of processing related to the program update performed by the control system 200.

FIG. 11 illustrates a flowchart of an exemplary execution procedure of processing related to the program update performed by the control system 200. The flowchart in FIG. 11 is started when the IG switch of the vehicle 20 is turned off. At S1002, the selection unit 260 acquires the remaining capacity of the low voltage battery 297.

At S1004, the selection unit 260 selects the update program for performing the program update for the ECU. For example, the selection unit 260, based on the remaining capacity of the low voltage battery 297 and the power consumption information attached to the update package, selects the update program for performing the program update for the ECU. Note that the selection unit 260 may select the update program based on a free memory capacity held in the ECU to be targeted for the program update. For example, the selection unit 260 may select the update program for performing the program update for the ECU provided that the free memory capacity in the ECU exceeds the capacity required for processing the program update.

At S1006, the specifying unit 240 specifies the function to be limited during the program update by the update program selected at S1004. The specifying unit 240, based on the vehicle type information of the vehicle 20 and the identification information contained in the update package, specifies the function to be limited during the program update. At S1008, the notification control unit 230 notifies the user of the information indicating the function specified at S1006.

Subsequently, at S1010, the update control unit 220 starts the program update. Note that, at S1010, the update control unit 220 instructs the ECU to perform activation when the program update is to be performed for the ECU comprising the double bank memory. On the other hand, when the program update is to be performed for the ECU comprising the single bank memory, the update control unit 220 instructs writing of the update program in the program storage area in the ECU and instructs the ECU to perform activation.

At S1012, when the processing of the program update is completed, the power status of the vehicle 20 is turned off and the processing of this flowchart is terminated.

As described above, according to the update system 10 of this embodiment, the information processing apparatus 72, based on the identification information embedded in the update program 60, automatically generates the message to be notified to the user before the program update is performed with the update program to attach the message to the update package containing the update program. This can reduce the possibility, due to the human errors or the like, that the update package is transmitted to the vehicle before the message regarding the function limitation is given. In addition, before the program update is performed with the update program, the control system 200 displays the message contained in the update package for notification to the user. Moreover, the control system 200, based on the identification information contained in the update program, notifies the user of the function to be limited during the program update. This allows explicitly informing the user of the function to be limited before the function limitation occurs due to the program update, even when the user fails to notice the message contained in the update package.

Note that the vehicle 20 is a vehicle as an example of transportation equipment. The vehicle may be an automobile such as an automobile comprising an internal combustion engine, an electric vehicle, and a fuel cell vehicle (FCV). The automobile includes, e.g. a bus, a truck, and a two-wheeled vehicle. The vehicle may be a saddle type vehicle or the like, and may be a motorcycle. The transportation equipment includes, aside from the vehicle, equipment such as an aircraft including an unmanned aircraft, and a ship. The transportation equipment may be any equipment for transporting people or items. The transportation equipment is an example of the mobile object. The mobile object is not limited to the transportation equipment but may be any movable equipment.

Figure 12:
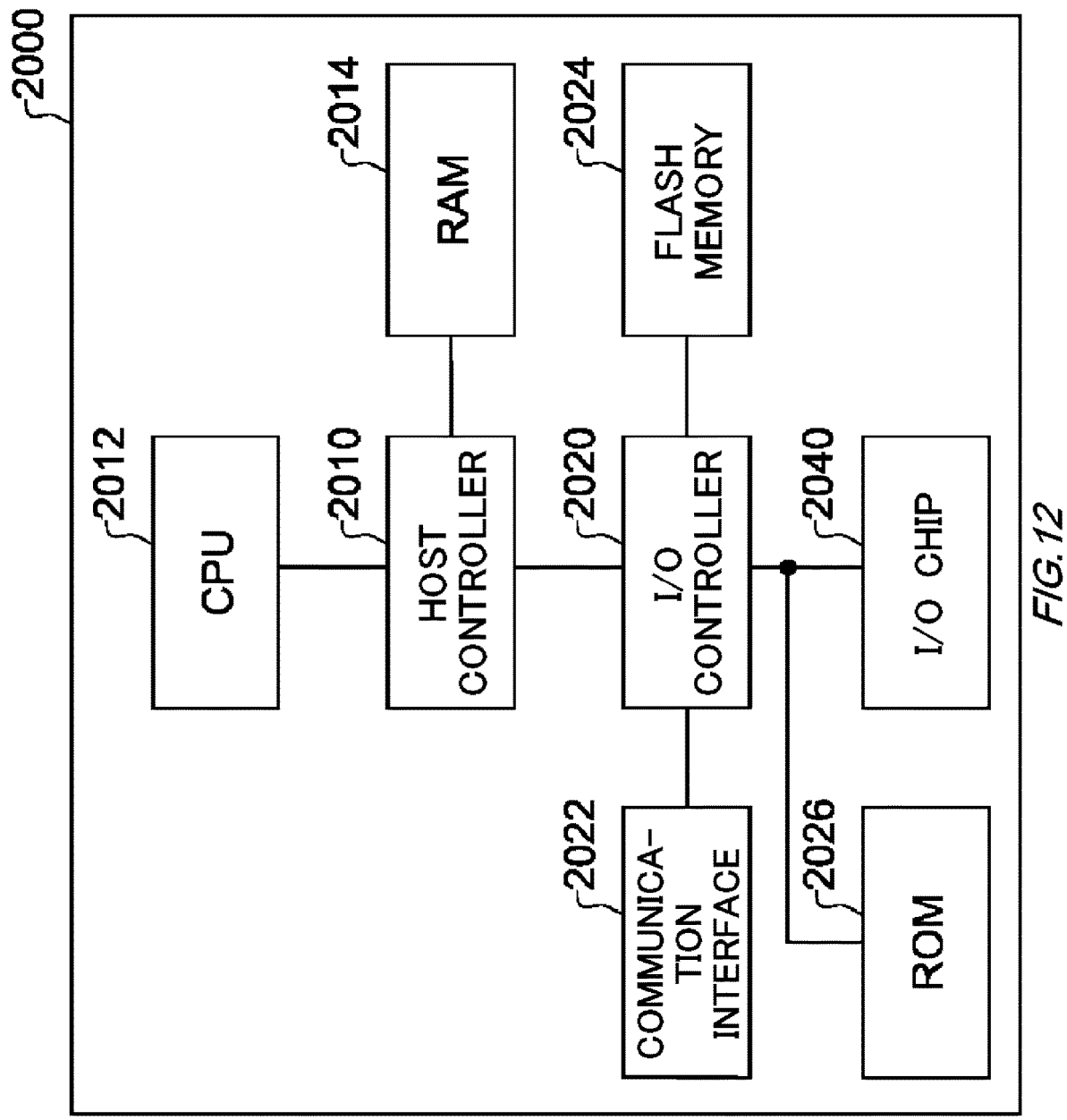
FIG. 12 illustrates an example of a computer 2000.

FIG. 12 illustrates an exemplary computer 2000 in which some embodiments of the present invention may be wholly or partially embodied. A program installed in the computer 2000 can cause the computer 2000 to function as a system such as a control system or each part of the system or an apparatus such as an information processing apparatus or each part the apparatus according to the embodiments, perform operations associated with the system or each part of the system or the apparatus or each part of the apparatus, and/or perform a process or steps of the process according to the embodiments. Such a program may be executed by a CPU 2012 to cause the computer 2000 to perform specific operations associated with some or all of blocks in the processing procedures and block diagrams described in the specification.

The computer 2000 according to this embodiment includes the CPU 2012 and a RAM 2014, which are connected to each other by a host controller 2010. The computer 2000 also includes a ROM 2026, a flash memory 2024, a communication interface 2022, and an I/O chip 2040. The ROM 2026, the flash memory 2024, the communication interface 2022, and the I/O chip 2040 are connected to the host controller 2010 via an I/O controller 2020.

The CPU 2012 operates in accordance with programs stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 upon activation, and/or a program dependent on hardware of the computer 2000. The I/O chip 2040 may also connect various I/O units, such as a keyboard, a mouse, and a monitor, to the I/O controller 2020 via I/O ports, such as a serial port, a parallel port, a keyboard port, a mouse port, a monitor port, an USB port, and an HDMI (registered trademark) port.

The program is provided via a computer-readable storage medium, such as a CD-ROM, a DVD-ROM, or a memory card, or via a network. The RAM 2014, the ROM 2026, or the flash memory 2024 are examples of the computer-readable storage medium. The program is installed in the flash memory 2024, the RAM 2014, or the ROM 2026, and executed by the CPU 2012. Information processing described in such a program is read by the computer 2000 to link the program with the various types of hardware resources as mentioned above. The apparatus or method may be configured by embodying the information operation or processing using the computer 2000.

For example, upon performing the communication between the computer 2000 and an external device, the CPU 2012 may execute a communication program loaded in the RAM 2014 and, based on the processing described in the communication program, instruct the communication interface 2022 to perform communication processing. The communication interface 2022, under control of the CPU 2012, reads transmission data stored in a transmission buffer processing area provided in a recording medium such as the RAM 2014 and the flash memory 2024, transmits the read transmission data to the network, and writes the received data received from the network in a reception buffer processing area or the like provided on a recording medium.

In addition, the CPU 2012 may allow the RAM 2014 to read all or necessary parts of a file or database stored in the recording medium such as the flash memory 2024, and perform various types of processing for the data stored on the RAM 2014. The CPU 2012 then writes back the processed data in the recording medium.

Various types of information such as various types of programs, data, tables, and databases may be stored in the recording medium for information processing. On the data read from the RAM 2014, the CPU 2012 may perform various types of processing including various types of operations, information processing, condition determination, conditional branching, unconditional branching, and information retrieval/conversion, which are described in the specification and specified by an instruction sequence of the program, and writes back the results in the RAM 2014. The CPU 2012 may also retrieve information in a file, database, or the like in the recording medium. For example, when the recording medium stores a plurality of entries each having an attribute value of a first attribute associated with an attribute value of a second attribute, the CPU 2012 may retrieve an entry from the plurality of entries that matches a condition in which the attribute value of the first attribute is specified, and read the attribute value of the second attribute stored in the entry, thereby acquiring the attribute value of the second attribute associated with the first attribute that satisfies a predetermined condition.

The programs or software modules described above may be stored in the computer-readable storage medium on the computer 2000 or in the vicinity of the computer 2000. A storage medium such as a hard disk or a RAM provided in a server system connected to a dedicated communication network or the Internet is usable as the computer-readable storage medium. The program stored in the computer-readable storage medium may be provided to the computer 2000 via the network.

The program installed in the computer 2000 and causes the computer 2000 to function as the control system 200 may operate on the CPU 2012 or the like to cause the computer 2000 to function as each part of the control system 200. The information processing described in these programs are read in the computer 2000, thereby functioning as each part of the control system 200 which serves as specific means under cooperation of the software and the various types of hardware resources as described above. Thus, these specific means embody arithmetic operation or processing of information depending on a purpose of use of the computer 2000 in this embodiment, thereby establishing the control system 200 specific to the purpose of use.

The program installed in the computer 2000 and causes the computer 2000 to function as the information processing apparatus 72 may operate on the CPU 2012 or the like to cause the computer 2000 to function as each part of the information processing apparatus 72. The information processing described in these programs are read in the computer 2000, thereby functioning as each part of the information processing apparatus 72 which serves as specific means under cooperation of the software and the various types of hardware resources as described above. Thus, these specific means embody arithmetic operation or processing of information depending on a purpose of use of the computer 2000 in this embodiment, thereby establishing the information processing apparatus 72 specific to the purpose of use.

Various embodiments have been described with reference to the block diagrams or the like. In the block diagrams, each block may represent: (1) a step of a process for performing an operation; or (2) each part of an apparatus having a function to perform an operation. A specific step or each part may be implemented by a dedicated circuit, a programmable circuit provided along with computer-readable instructions stored on a computer-readable storage medium, and/or a processor provided along with computer-readable instructions stored on a computer-readable storage medium. The dedicated circuit may include a digital and/or analog hardware circuit, and may include an integrated circuit (IC) and/or a discrete circuit. The programmable circuit may include a reconfigurable hardware circuit, including, e.g. logic operations such as logic AND, logic OR, logic XOR, logic NAND, logic NOR, and the like, as well as memory elements such as a flip-flop, a register, a field programmable gate array (FPGA), a programmable logic array (PLA), and the like.

The computer-readable storage medium may include any tangible device that can store instructions to be performed by a suitable device, so that the computer-readable storage medium having the instructions stored therein constitutes at least a part of a product containing the instructions that can be executed to provide means for performing the operations specified in the processing procedures or block diagrams. Examples of the computer-readable storage medium may include an electronic storage medium, a magnetic storage medium, an optical storage medium, a magneto-electric storage medium, a semiconductor storage medium, and the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically-erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk (registered trademark), JAVA (registered trademark), or C++, and conventional procedural programming languages, such as C programming languages or similar programming languages.

The computer-readable instructions are provided to processors or programmable circuits of general-purpose computers, special-purpose computers, or other programmable data processing apparatuses, locally or via a local area network (LAN) or a wide area network (WAN) such as the Internet, wherein the computer-readable instructions may be executed to provide means for performing the operations specified in the described processing procedures or block diagrams. Examples of the processors include a computer processor, a processing unit, a microprocessor, a digital signal processor, a controller, a microcontroller, and the like.

While the embodiments of the present invention have been described, the technical scope of the present invention is not limited to the scope described in the above embodiments. It is apparent to persons skilled in the art that various alterations or improvements can be added to the above embodiments. It is also apparent from the description of the claims that the embodiments added with such alterations or improvements can be included in the technical scope of the present invention.

Each processing of the operations, procedures, steps, stages, and the like performed by the apparatus, system, program, and method illustrated in the claims, specification, or diagrams can be embodied in any order unless the execution order is explicitly specified by terms "prior to," "before," or the like and unless the output from a previous process is used in a later process. Even if the operational flow is described using terms "first," "next," or the like in the claims, specification, or diagrams, it does not necessarily mean that the flow must be performed in that order.

EXPLANATION OF REFERENCES

10: update system
20: vehicle
60: update program
62: update package 70: external device
72: information processing apparatus
74: program registration device
90: communication network
200: control system
201: TCU
202: ECU
204: ECU
205: ECU
206: ECU
220: update control unit
230: notification control unit
240: specifying unit
260: selection unit
280: in-vehicle communication line
294: FI
295: high voltage battery
296: locking device
297: low voltage battery
298: MID
299: IVI
300: processing unit
310: update program acquisition unit
320: identification information acquisition unit
330: message generation unit
340: output control unit
380: storage unit
390: communication unit
410: descriptive text
420: message
430: amount of power information
490: program administrator
600: user notification information
610: information
620: information
630: UI button
700: user notification information
720: function limitation information
820: function limitation information
2000: computer
2010: host controller
2012: CPU
2014: RAM
2020: I/O controller
2022: communication interface
2024: flash memory
2026: ROM
2040: I/O chip

What is claimed is:

1. A control system comprising:
at least one processor;
a mobile object control unit configured, using the at least one processor, to control a mobile object;
an update control unit configured, using the at least one processor, to control reception of one or more update programs for the mobile object control unit from an external device and to control an update of the mobile object control unit with the one or more update programs, wherein the one or more update programs include identification information to identify a function, among a plurality of functions of the mobile object, to be limited in the mobile object during the update of the mobile object control unit with the one or more update programs; and
a notification control unit configured, using the at least one processor, to notify, based on the identification information included in the one or more update programs, a user which function, among the plurality of functions of the mobile object, is to be limited in the mobile object during the update of the mobile object control unit with the one or more update programs.

2. The control system according to claim 1, wherein:
for the one or more update programs, the identification information is given as well as mobile object specifying information for specifying the mobile object in which the function is limited in the mobile object;
the control system further comprising a specifying unit configured, using the at least one processor, to, based on the identification information and the mobile object specifying information given to the one or more update programs, specify a function to be limited in the mobile object during the update of the mobile object control unit with the one or more update programs; and
the notification control unit, based on the function to be limited in the mobile object specified by the specifying unit, controls notification to the user which function, among the plurality of functions of the mobile object, is to be limited in the mobile object during the update of the mobile object control unit with the one or more update programs.

3. The control system according to claim 2, wherein:
the control system further comprising a selection unit configured, using the at least one processor, to select an update program for updating the mobile object control unit from among the one or more update programs; and
the specifying unit, based on the identification information and the mobile object specifying information given to each update program of the one or more update programs, specifies a function to be limited in the mobile object during the update of the mobile object control unit with the update program selected by the selection unit.

4. The control system according to claim 3, wherein:
the notification control unit, before the update of the mobile object control unit starts with the update program selected by the selection unit, notifies the user of the function to be limited in the mobile object specified by the specifying unit.

5. The control system according to claim 4, wherein:
the selection unit, based on a remaining amount of a battery provided in the mobile object, selects one update program for updating the mobile object control unit from among the one or more update programs.

6. The control system according to claim 5, wherein:
the selection unit, based on an amount of power to be consumed when the mobile object control unit to be targeted for the update is updated with each update program of the one or more update programs and the remaining amount of the battery provided in the mobile object, selects one update program for updating the mobile object control unit from among the one or more update programs.

7. The control system according to claim 3, wherein:
the selection unit, based on a remaining amount of a battery provided in the mobile object, selects one update program for updating the mobile object control unit from among the one or more update programs.

8. The control system according to claim 7, wherein:
the selection unit, based on an amount of power to be consumed when the mobile object control unit to be targeted for the update is updated with each update program of the one or more update programs and the remaining amount of the battery provided in the mobile object, selects one update program for updating the mobile object control unit from among the one or more update programs.

9. The control system according to claim 1, wherein:
the control system updates the mobile object control unit through an OTA (Over The Air).

10. The control system according to claim 9, wherein:
the mobile object is a vehicle; and
the mobile object control unit is an ECU (Electronic Control Unit).

11. The control system according to claim 10, wherein:
a function to be limited in the mobile object includes at least one of a charging function and a locking function of the vehicle.

12. The control system according to claim 10, wherein:
a function to be limited in the mobile object includes a charging function of the mobile object.

13. A mobile object comprising:
control system according to claim 1.

14. The mobile object according to claim 13, wherein:
the mobile object is a vehicle.

15. The mobile object according to claim 14, wherein:
the mobile object control unit is an ECU (Electronic Control Unit) provided in the vehicle.

16. An information processing apparatus comprising:
at least one processor;
an update program acquisition unit configured, using the at least one processor, to acquire an update program to update a mobile object control unit provided in a mobile object;
an identification information acquisition unit configured, using the at least one processor, to acquire identification information included in the update program, wherein the identification information identifies a function, among a plurality of functions of the mobile object, to be limited in the mobile object during an update of the mobile object control unit with the update program;
a message generation unit configured, using the at least one processor, to, based on the identification information acquired by the identification information acquisition unit, generate a message indicating which function, among the plurality of functions of the mobile object, is to be limited in the mobile object during the update of the mobile object control unit with the update program; and
an output control unit configured, using the at least one processor, to control an output of the message generated by the message generation unit by attaching the message generated by the message generation unit to the update program.

17. A control method comprising:
controlling reception of one or more update programs for a mobile object control unit, which is configured to control a mobile object, from an external device;
wherein the one or more update programs are embedded with identification information for identifying a function, among a plurality of functions of the mobile object, to be limited in the mobile object during an update of the mobile object control unit with the one or more update programs;
based on the identification information embedded in the one or more update programs, controlling notification to a user which function, among the plurality of functions of the mobile object, is to be limited in the mobile object during the update of the mobile object control unit with the one or more update programs; and
controlling the update of the mobile object control unit with the one or more update programs.

18. An information processing method comprising:
acquiring an update program to update a mobile object control unit provided in a mobile object;
acquiring identification information included in the update program, wherein the identification information identifies a function, among a plurality of functions of the mobile object, to be limited in the mobile object during an update of the mobile object control unit with the update program;
based on the identification information included in the update program, generating a message indicating which function, among the plurality of functions of the mobile object, is to be limited in the mobile object during the update of the mobile object control unit with the update program; and
controlling an output of the message by attaching the message to the update program.

* * * * *